UNITED STATES PATENT OFFICE.

AUGUST SCHRADER, OF NEW YORK, N. Y.

ACID AND WATER PROOF INK.

1,195,612. Specification of Letters Patent. Patented Aug. 22, 1916.

No Drawing. Application filed November 8, 1915. Serial No. 60,421.

*To all whom it may concern:*

Be it known that I, AUGUST SCHRADER, citizen of the United States, residing at New York, in the county of New York and State of New York, have invented certain new and useful Improvements in Acid and Water Proof Ink, of which the following is a specification.

My invention relates to new and useful improvements in writing fluids, the primary object being the provision of an acid and waterproof ink. In this connection, it should be noted that the term "acid proof ink" is intended to merely express the fact that the ink is proof against acids of the nature used in all commercial ink eradicators and not that it is proof against exceptionally strong acids. However, inasmuch as acids any stronger than those used in ink eradicators would injure the paper, the ink will, of course, be sufficiently acid proof to prevent successful tampering with any writing in which it has been employed.

A further object of my invention is the provision of a water and acid proof ink of the above described character which can be employed in fountain pens.

More specifically, my improved ink consists of 8 parts Silesian soluble blue, 1 part nigrosin, .2 part oxalic acid, .8 part india ink, 290 parts water.

The Silesian soluble blue employed is also known as Prussian blue and as the Tirnann's brand which has the formula $[K_2Fe_2(CN)_6]_2$.

Although the above constitutes the preferred formula for my ink, it will of course be understood that slight changes in proportions of the various ingredients may be made if deemed advisable.

In making the ink according to the above formula, the india ink is first rubbed or ground down in the usual manner and then steeped in a solution of the oxalic acid until thoroughly dissolved. The nigrosin is then steeped in lukewarm water and after being dissolved in such water is strained. The resultant india ink and oxalic acid solution and the resultant nigrosin solution are then mixed together with the Silesian soluble blue and remaining water and thoroughly stirred, after which the resultant mixture or solution is strained through layers of silk to remove impurities or suspended matter. After being strained, it may be bottled or otherwise packaged for the market, being then ready for use.

Having thus described the invention, what is claimed as new is:

1. A writing fluid including Silesian soluble blue, nigrosin, oxalic acid, india ink and water.

2. A writing fluid including Silesian soluble blue, nigrosin, oxalic acid, india ink and water, the water constituting substantially twenty-nine thirtieths of the fluid.

3. A writing fluid including Silesian soluble blue 8 parts, nigrosin 1 part, oxalic acid .2 part, india ink .8 part, and water 290 parts.

In testimony whereof I affix my signature in presence of two witnesses.

AUGUST SCHRADER. [L. S.]

Witnesses:
WILLIAM H. DAVIS,
CHAS. J. HOWE.